US008543699B2

(12) United States Patent
Beigi et al.

(10) Patent No.: US 8,543,699 B2
(45) Date of Patent: Sep. 24, 2013

(54) METHOD AND APPARATUS FOR DISTRIBUTED POLICY EVALUATION

(75) Inventors: Mandis S. Beigi, White Plains, NY (US); Seraphin Calo, Courtland Manor, NY (US); David A. George, Somers, NY (US); Dinesh Verma, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 1245 days.

(21) Appl. No.: 11/680,307

(22) Filed: Feb. 28, 2007

(65) Prior Publication Data

US 2008/0209047 A1 Aug. 28, 2008

(51) Int. Cl.
*G06F 15/173* (2006.01)
*G06F 15/16* (2006.01)

(52) U.S. Cl.
USPC ............ 709/226; 709/223; 709/224; 709/236

(58) Field of Classification Search
USPC ........................................................ 709/226
See application file for complete search history.

(56) References Cited

U.S. PATENT DOCUMENTS

| | | | | |
|---|---|---|---|---|
| 7,058,015 B1* | 6/2006 | Wetherall et al. | ............. | 370/236 |
| 7,355,968 B2* | 4/2008 | Liu et al. | ........................ | 370/225 |
| 7,450,005 B2* | 11/2008 | Anand et al. | ................... | 340/541 |
| 2004/0128674 A1* | 7/2004 | Grabarnik et al. | ............. | 719/318 |
| 2004/0230752 A1* | 11/2004 | Blake et al. | .................... | 711/147 |
| 2005/0091352 A1* | 4/2005 | Alex et al. | ...................... | 709/223 |
| 2005/0198050 A1* | 9/2005 | Bivens et al. | ................. | 707/100 |
| 2005/0240558 A1* | 10/2005 | Gil et al. | ........................... | 707/1 |
| 2006/0085648 A1* | 4/2006 | Cheston et al. | ............... | 713/182 |
| 2007/0006278 A1* | 1/2007 | Ioan Avram et al. | .............. | 726/1 |
| 2007/0033273 A1* | 2/2007 | White et al. | .................. | 709/223 |
| 2007/0260570 A1* | 11/2007 | Hinchey et al. | ................. | 706/47 |

* cited by examiner

*Primary Examiner* — Richard G Keehn
(74) *Attorney, Agent, or Firm* — Preston Young

(57) ABSTRACT

In one embodiment, the invention is a method and apparatus for distributed policy evaluation. One embodiment of a method for evaluating a systems management policy, where the policy includes a condition and an action to be taken when the condition evaluates to TRUE, includes forwarding the policy, by a first autonomic manager, to a second autonomic manager and receiving at the first autonomic manager at least partial evaluation results for the condition from a third autonomic manager. The first autonomic manager, the second autonomic manager, and the third autonomic manager are arranged in a ring configuration such that the evaluating occurs in a cascading manner, and only the first autonomic manager has access to a policy storage from which the policy is retrieved.

14 Claims, 11 Drawing Sheets

METHOD AND APPARATUS FOR DISTRIBUTED POLICY EVALUATION

BACKGROUND OF THE INVENTION

The present invention generally relates to systems management, and more particularly relates to the evaluation of systems management policies.

FIG. 1 is a block diagram illustrating one example of a conventional policy-based management system 100. The system 100 comprises an autonomic manager 102, a managed resource 104 and a policy editor storage 106. The autonomic manager 102 makes decisions regarding the management of the managed resource 104, in accordance with one or more condition/action specifications stored in the policy editor storage 106.

The managed resource 104 includes a set of sensors 108 by which the autonomic manager 102 obtains values from the managed resource 104 (via connection 112) and a set of effectors 110 by which the autonomic manager 102 effects actions (via connection 114) when the values cause a policy's condition(s) to evaluate to true. The autonomic manager 102 evaluates policies related to the managed resource 104 and renders a decision to the managed resource 104 that is interpreted as either: (1) data to be processed by the managed resource 104; or (2) action(s) to be taken by the managed resource 104. In some cases, the managed resource 104 can obtain a policy evaluation from the autonomic manager 102 on demand, via decision point 116 and connection 118.

Although such policy-based management systems greatly simplify the administration of information technology (IT) environments, they do require a system administrator to specify separate sets of policies for each supported domain, which greatly complicates the system administrator's job, particularly for complex systems.

Therefore, there is a need in the art for a method and apparatus for distributed policy evaluation.

SUMMARY OF THE INVENTION

In one embodiment, the invention is a method and apparatus for distributed policy evaluation. One embodiment of a method for evaluating a systems management policy, where the policy includes a condition and an action to be taken when the condition evaluates to TRUE, includes forwarding the policy, by a first autonomic manager, to a second autonomic manager and receiving at the first autonomic manager at least partial evaluation results for the condition from a third autonomic manager. The first autonomic manager, the second autonomic manager, and the third autonomic manager are arranged in a ring configuration such that the evaluating occurs in a cascading manner, and only the first autonomic manager has access to a policy storage from which the policy is retrieved.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

It is to be noted, however, that the appended drawings illustrate only exemplary embodiments of this invention and are therefore not to be considered limiting of its scope, for the invention may admit to other equally effective embodiments.

DETAILED DESCRIPTION

The present invention is a method and apparatus for distributed policy evaluation. Embodiments of the present invention provide for the partial evaluation of unified policies in a cooperative, distributed systems environment. This allows a system administrator to specify unified policies targeting all of the different domains (e.g., Quality of Service (QoS), Security, Database, etc.) of an information technology (IT) environment, instead of specifying separate policies for each domain. The administration of the IT environment is thus automated and greatly simplified.

Figure 1:
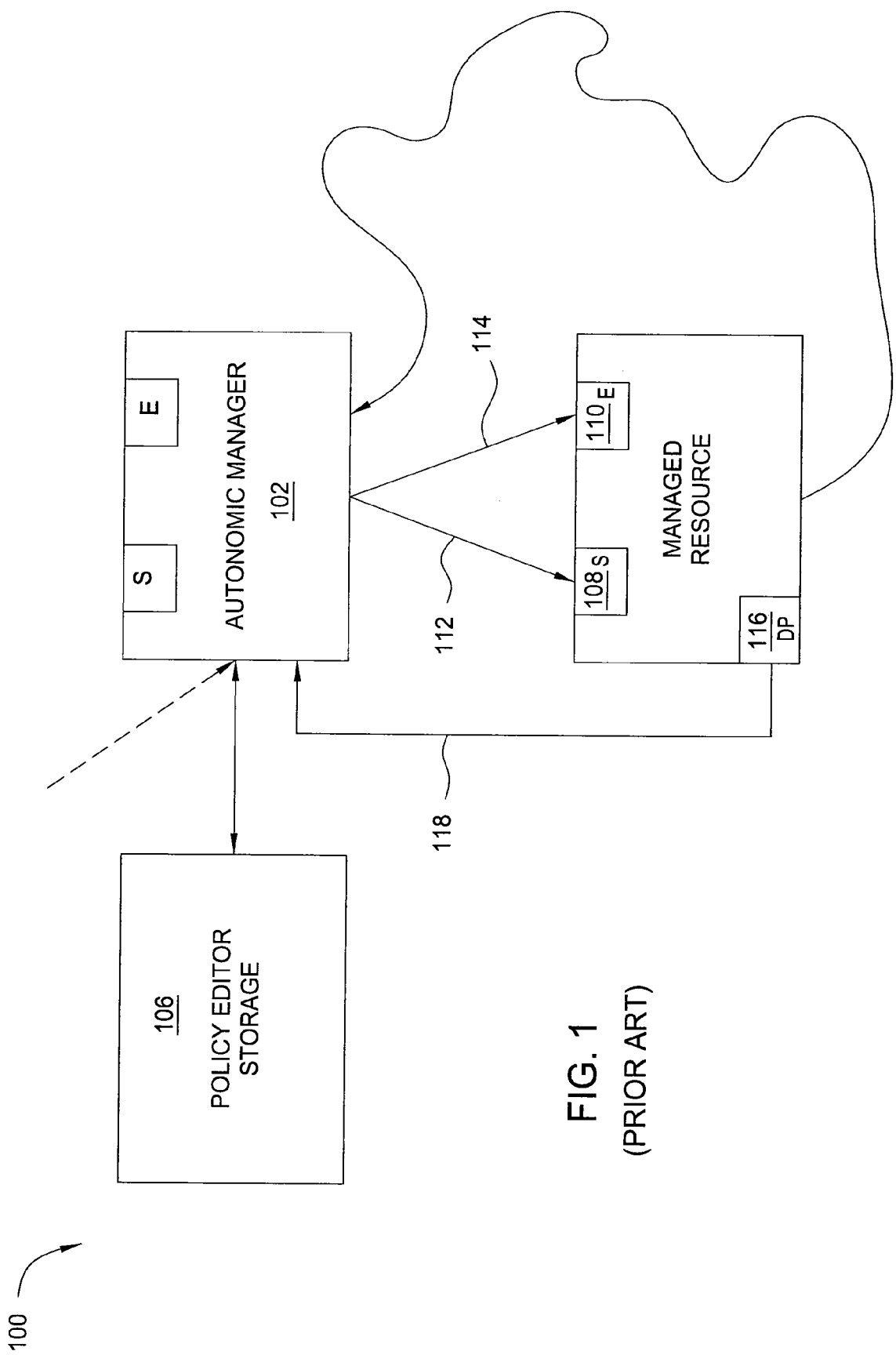
FIG. 1 is a block diagram illustrating one example of a conventional policy-based management system.
Figure 2:
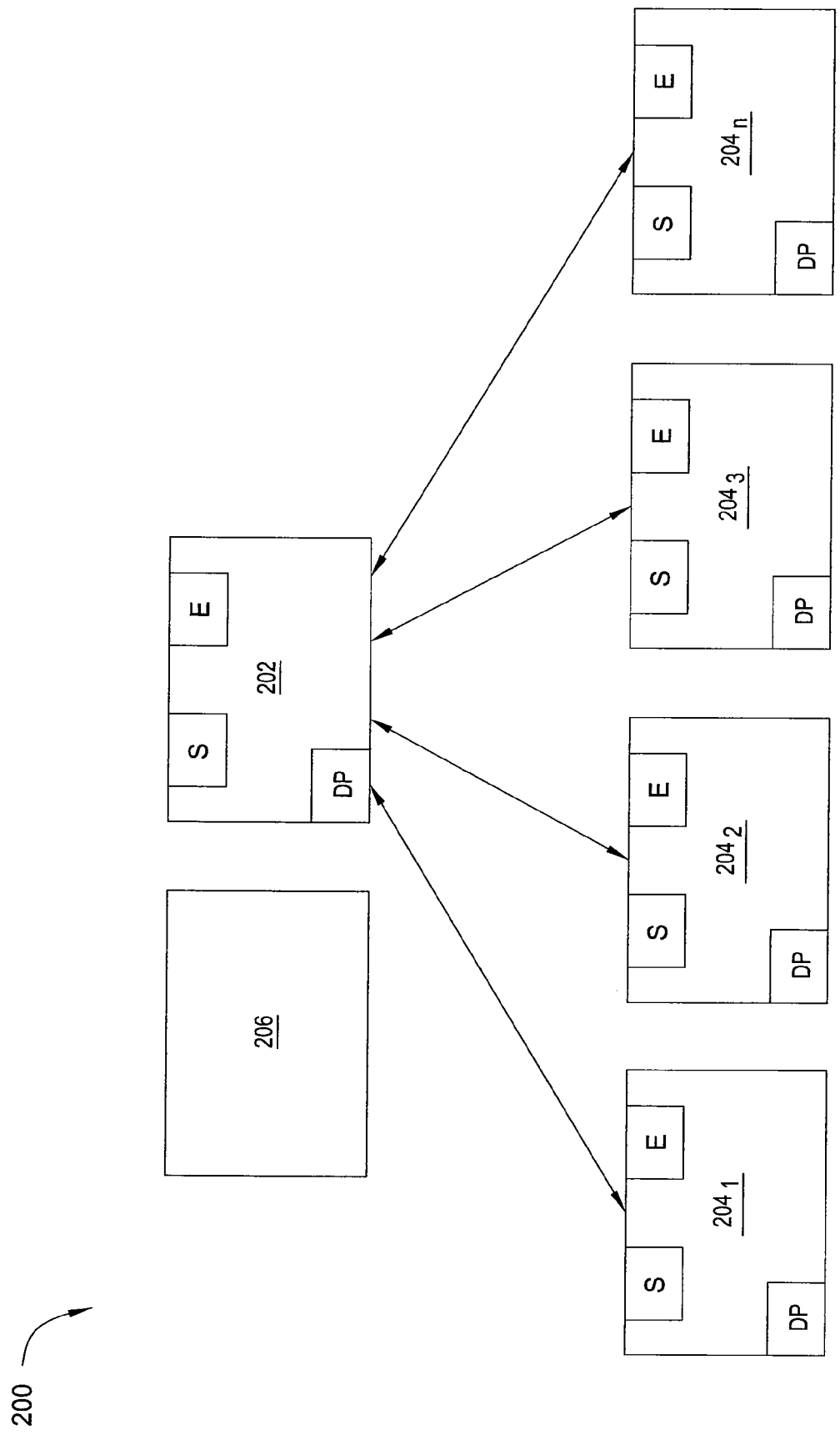
FIG. 2 is a block diagram illustrating one example of a policy-based management system, according to the present invention.

FIG. 2 is a block diagram illustrating one example of a policy-based management system 200, according to the present invention. The system 200 comprises a coordinating autonomic manager 202 that manages a plurality of cooperating autonomic managers $204_1$-$204_n$ (hereinafter collectively referred to as "cooperating autonomic managers 204").

The coordinating autonomic manager 202 has access to a policy editor storage 206, from which the coordinating autonomic manager 202 retrieves policies for evaluation. As described in greater detail below with respect to FIGS. 3 and 4, the coordinating autonomic manager 202 manages evaluation of these policies by the cooperating autonomic managers 204, each of which partially evaluates the policies and reports back to the coordinating autonomic manager 202.

Figure 3:
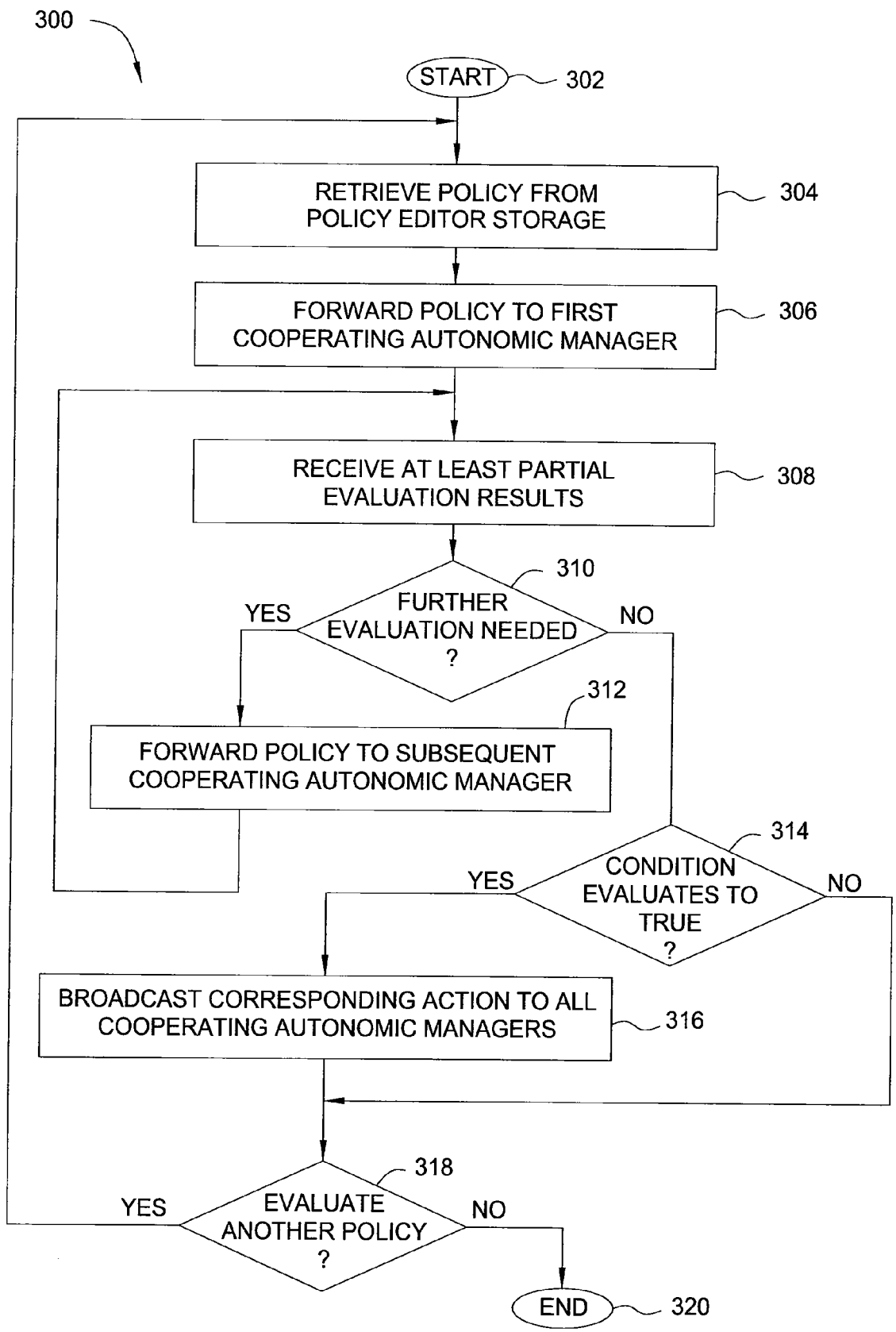
FIG. 3 is a flow diagram illustrating one embodiment of a method for evaluating policies in a policy-based management system.

FIG. 3 is a flow diagram illustrating one embodiment of a method 300 for evaluating policies in a policy-based management system. The method 300 may be implemented, for example, by the coordinating autonomic manager 202 of the system 200 illustrated in FIG. 2.

The method 300 is initialized at step 302 and proceeds to step 304, where the method 200 retrieves a policy (e.g., from the policy editor storage). In one embodiment, the policy is retrieved in response to a request from a managed resource to evaluate one or more policies (received, e.g., via a decision point). In another embodiment, the policy is retrieved in response to a request from the policy editor storage or another autonomic manager (e.g., one of the cooperating autonomic managers).

In step 306, the method 300 initiates evaluation of the retrieved policy by forwarding the retrieved policy to a first cooperating autonomic manager. The method 200 then receives at least a partial evaluation back from the cooperating autonomic manager in step 308.

In step 310, the method 300 determines whether further evaluation of the retrieved policy is needed. For instance, if the evaluation(s) thus received from the cooperating autonomic manager(s) do not represent a complete evaluation of the retrieved policy, the method 300 will need to forward the retrieved policy to at least on additional cooperating autonomic manager for evaluation of the remainder of the retrieved policy.

If the method 300 concludes in step 310 that further evaluation of the retrieved policy is needed, the method 300 proceeds to step 312 and forwards the retrieved policy to a subsequent cooperating autonomic manager before returning to step 308 and proceeding as described above to assess subsequent policy evaluation results.

Alternatively, if the method 300 concludes in step 310 that no further evaluation of the retrieved policy is needed (i.e., the retrieved policy has been fully evaluated by the cooperating autonomic manager(s)), the method 300 proceeds to step 314 and determines whether the condition embodied in the retrieved policy evaluates to TRUE based on the results received from the cooperating autonomic manager(s).

If the method 300 concludes in step 314 that the condition embodied in the retrieved policy evaluates to TRUE, the method 300 proceeds to step 316 and broadcasts the action that corresponds to the condition to all of the cooperating autonomic managers. That is, the method 300 ensures that the cooperating autonomic managers effect the action dictated by the retrieved policy for circumstances in which the condition evaluates to TRUE.

In step 318, the method 300 determines whether another policy should be evaluated. For instance, the policy just evaluated may be only one in a sequence of policies to be evaluated. In such a case, the method 300 may select an appropriate order in which the policies in the sequence are retrieved, but execution of the method 300 does not depend on a particular order of retrieval.

If the method 300 concludes in step 318 that another policy should be evaluated, the method 300 returns to step 304 and proceeds as described above to retrieve a subsequent policy for evaluation. Alternatively, if the method 300 concludes in step 318 that there are no policies remaining to be evaluated, the method 300 terminates in step 320. Referring back to step 314, if the method 300 concludes that the condition embodied in the current policy does not evaluate to TRUE, the method 300 proceeds directly to step 318.

Figure 4:
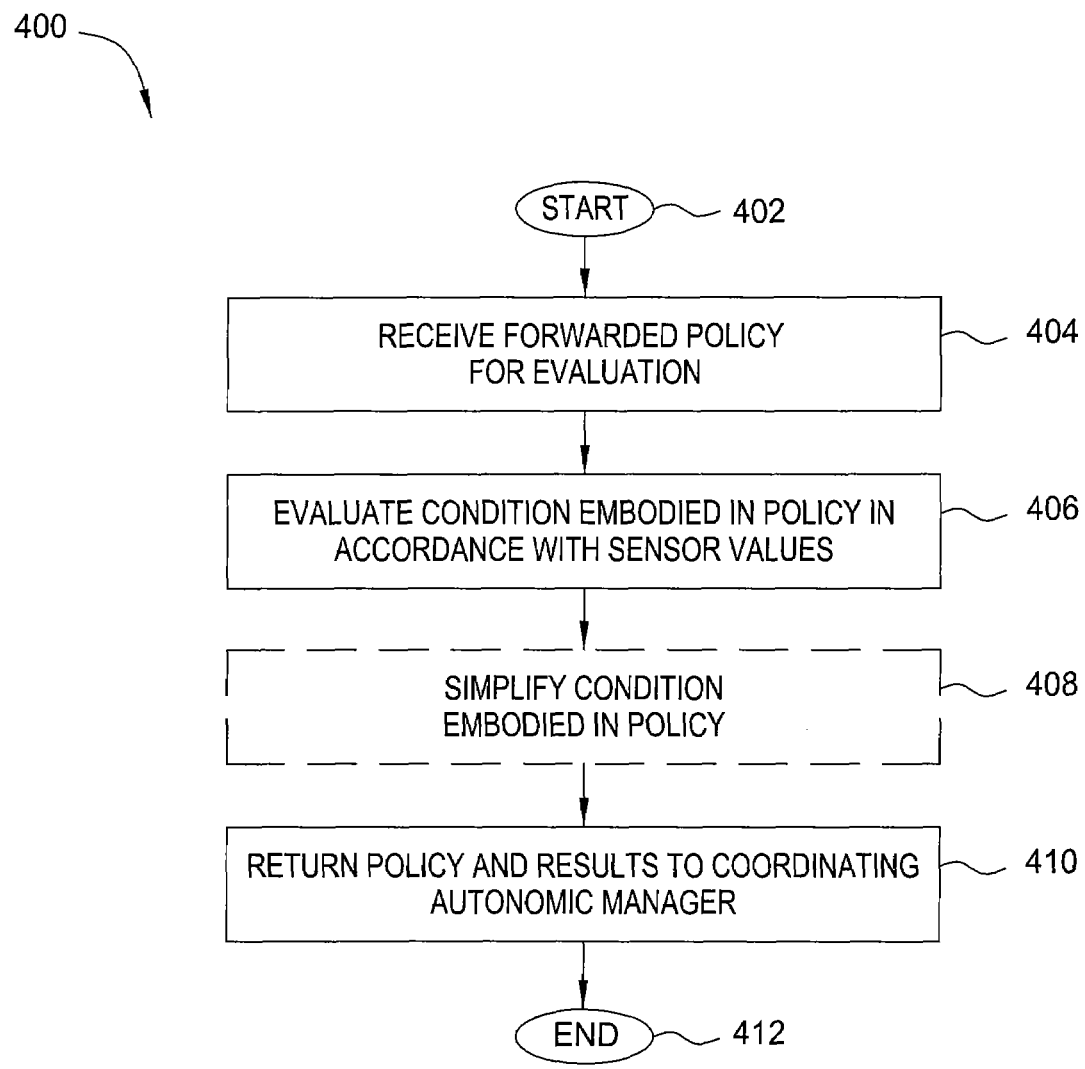
FIG. 4 is a flow diagram illustrating one embodiment of another method for evaluating policies in a policy-based management system.

FIG. 4 is a flow diagram illustrating one embodiment of another method 400 for evaluating policies in a policy-based management system. The method 400 may be implemented, for example, by a cooperating autonomic manager 204 of the system 200 illustrated in FIG. 2.

The method 400 is initialized at step 402 and proceeds to step 404, where the method 400 receives a policy (forwarded, for example, by the coordinating autonomic manager). In step 406, the method 406 at least partially evaluates the condition embodied in the forwarded policy, in accordance with one or more sensor values and/or other information known or available to the method 400.

In optional step 408 (illustrated in phantom), the method 400 simplifies the condition (i.e., logical expression) embodied in the forwarded policy. Simplification of the condition may be desirable in cases where data privacy is a concern, as it allows values to be hidden. However, in cases where data privacy is not a concern, or where quicker processing (e.g., through parallel rather than serial processing) is desired, it may make more sense to leave the condition in unsimplified form. One embodiment of a method for simplifying a condition embodied in a policy is discussed in greater detail below with respect to FIGS. 9 and 10. The method 400 then proceeds to step 410 and returns the (at least partially) evaluated policy and results to the coordinating autonomic manager before terminating in step 412.

Partial evaluation of policies as described above speeds the resolution of conditional expressions, because any condition that evaluates to TRUE can be passed immediately back to the coordinating autonomic manager for merging of results (i.e., rather than being forwarded to another cooperating autonomic manager). Thereafter, the coordinating autonomic manager may proceed with broadcasting action(s) to all of the cooperating autonomic managers or with the evaluation of a subsequent policy.

The present invention therefore provides for the partial evaluation of unified policies in a cooperative, distributed systems environment. This allows a system administrator to specify unified policies targeting all of the different domains (e.g., Quality of Service (QoS), Security, Database, etc.) of an information technology (IT) environment, instead of specifying separate policies for each domain. The administration of the IT environment is thus automated and greatly simplified.

In one embodiment, each domain's evaluation engine is called upon to partially evaluate the unified policies, while the system information from each domain is provided from separate entities and at different times. The present invention therefore enables each domain to keep all of its information and sensor values private, and there is no need for the domain to disclose this information to outside entities.

Figure 5:
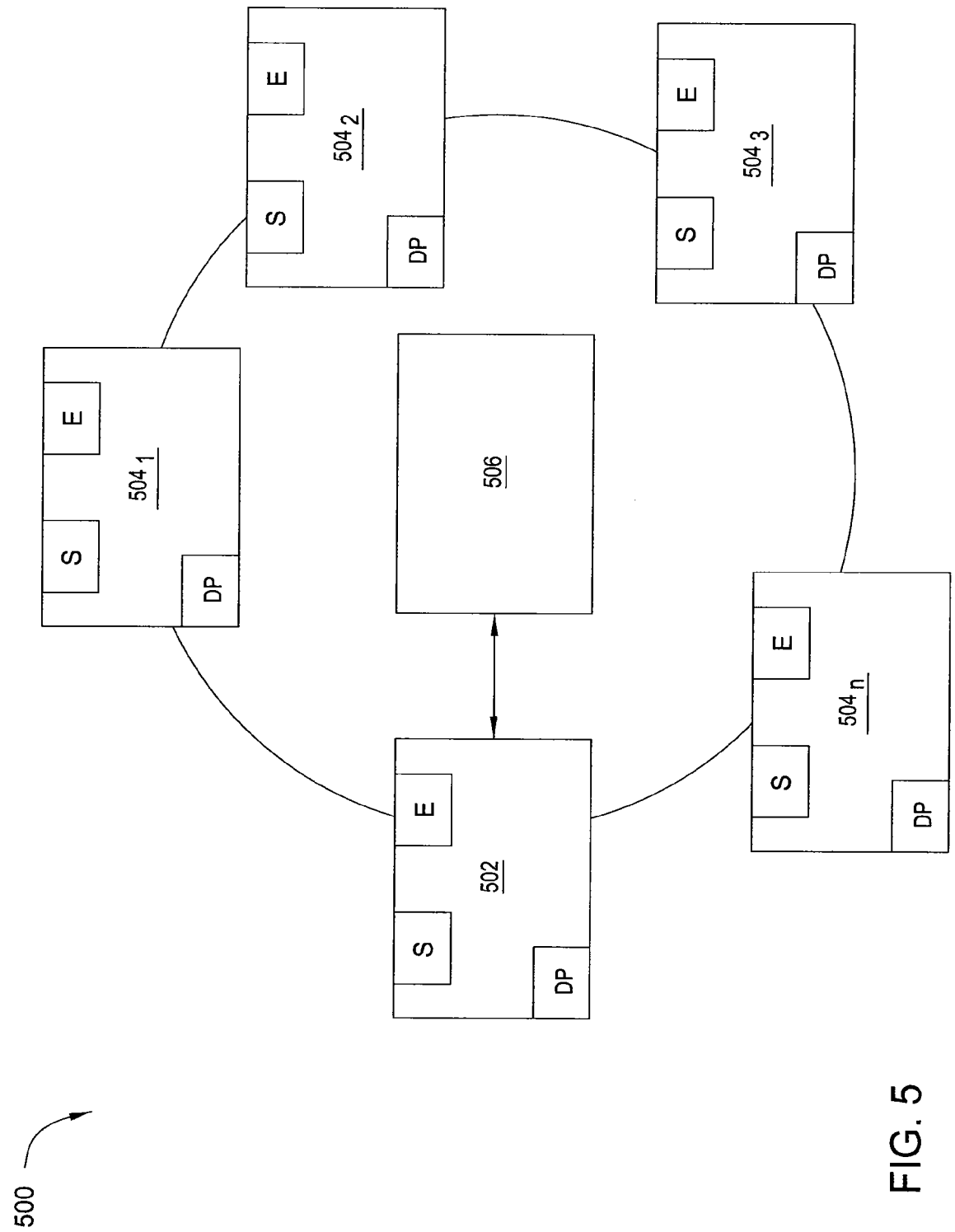
FIG. 5 is a block diagram illustrating another example of a policy-based management system, according to the present invention.

FIG. 5 is a block diagram illustrating another example of a policy-based management system 500, according to the present invention. The system 500 comprises a designated autonomic manager 502 that manages a plurality of cooperating autonomic managers $504_1$-$504_n$ (hereinafter collectively referred to as based "cooperating autonomic managers 504").

The designated autonomic manager 502 has access to a policy editor storage 506, from which the designated autonomic manager 502 retrieves policies for evaluation. As described in greater detail below with respect to FIGS. 6 and 7, the designated autonomic manager 502 manages evaluation of these policies by the cooperating autonomic managers 504, each of which partially evaluates the policies and reports back to the designated autonomic manager 502. Thus, like the system 200 illustrated in FIG. 2, the system 500 is a cooperative management system. However, unlike the system 200, in which the autonomic managers are configured in a "star" arrangement for centralized policy processing, the system 500 configured the autonomic managers in a "ring" arrangement for cascading policy processing. Thus, evaluation of a retrieved policy in accordance with the system 500 both starts and terminates at the designated autonomic manager 502, where the appropriate responsive action is subsequently initiated.

Figure 6:
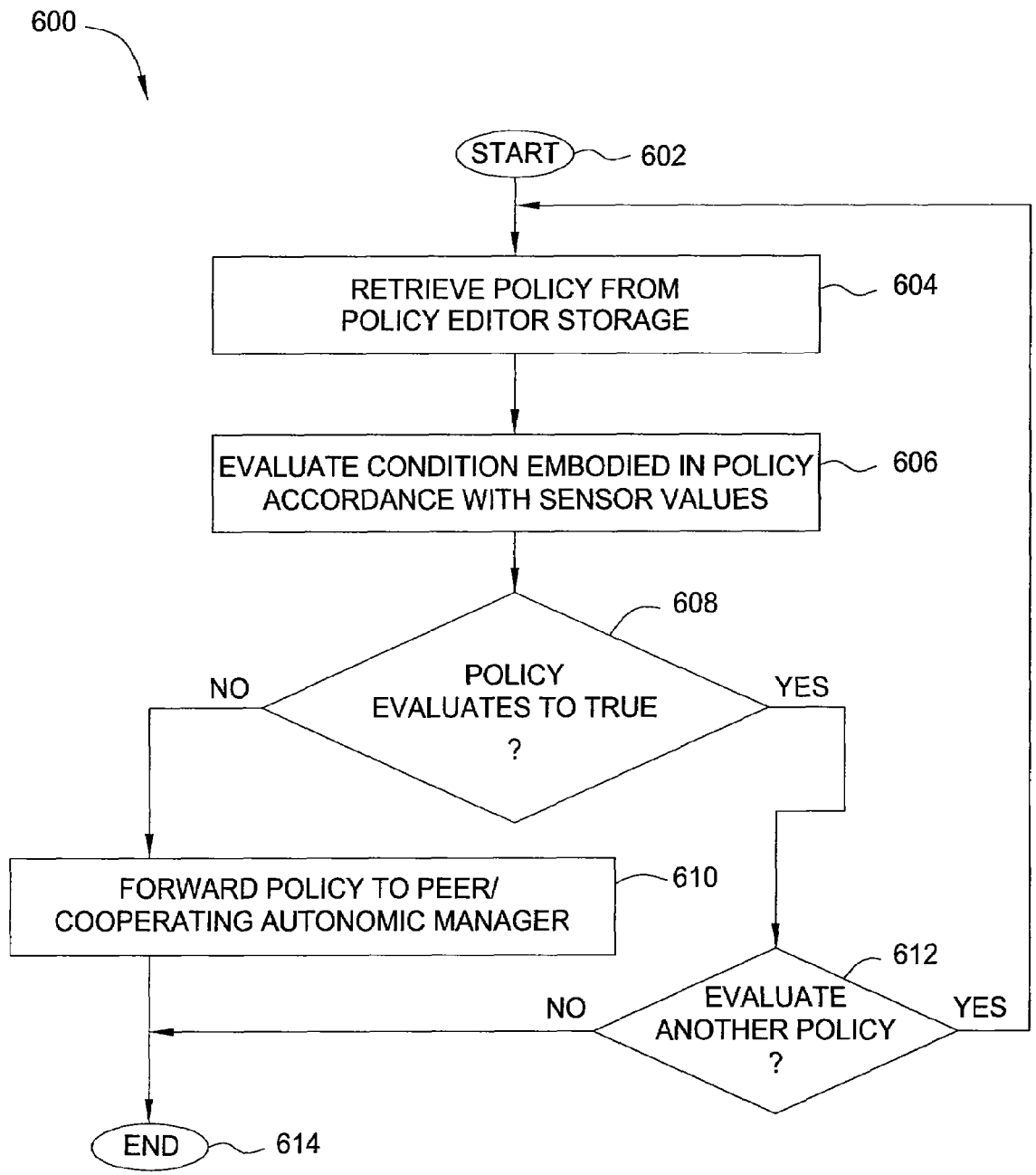
FIG. 6 is a flow diagram illustrating another embodiment of method for evaluating policies in a policy-based management system.

FIG. 6 is a flow diagram illustrating another embodiment of method 600 for evaluating policies in a policy-based management system. The method 600 may be implemented, for example, by the designated autonomic manager 502 of the system 500 illustrated in FIG. 5.

The method 600 is initialized at step 602 and proceeds to step 604 and retrieves a policy (e.g., from the policy editor storage). In one embodiment, the policy is retrieved in response to a request from a managed resource to evaluate one or more policies (received, e.g., via a decision point). In another embodiment, the policy is retrieved in response to a request from the policy editor storage or another autonomic manager (e.g., one of the cooperating autonomic managers).

In step 606, the method 600 initiates evaluation of the retrieved policy by at least partially evaluating the condition embodied in the retrieved policy. Then, in step 608, the method 600 determines whether, in light of the evaluation, the retrieved policy evaluates to TRUE (e.g., as opposed to being only partially evaluated).

If the method 600 concludes in step 608 that the retrieved policy does not evaluate to TRUE (e.g., the retrieved policy has only been partially evaluated), the method 600 proceeds to step 610 and forwards the retrieved policy to a peer autonomic manager (e.g., one of the cooperating autonomic managers 506 illustrated in FIG. 6) before terminating in step 614.

Alternatively, if the method 600 concludes in step 608 that the retrieved policy does evaluate to TRUE (e.g., the retrieved policy has been fully evaluated), the method 600 proceeds to step 612 and determines whether another policy should be evaluated. For instance, the policy just evaluated may be only one in a sequence of policies to be evaluated. In such a case, the method 600 may select an appropriate order in which the policies in the sequence are retrieved, but execution of the method 600 does not depend on a particular order of retrieval.

If the method 600 concludes in step 612 that another policy should be evaluated, the method 600 returns to step 604 and proceeds as described above to retrieve a subsequent policy for evaluation. Alternatively, if the method 600 concludes in step 612 that there are no policies remaining to be evaluated, the method 600 terminates in step 614.

Figure 7:
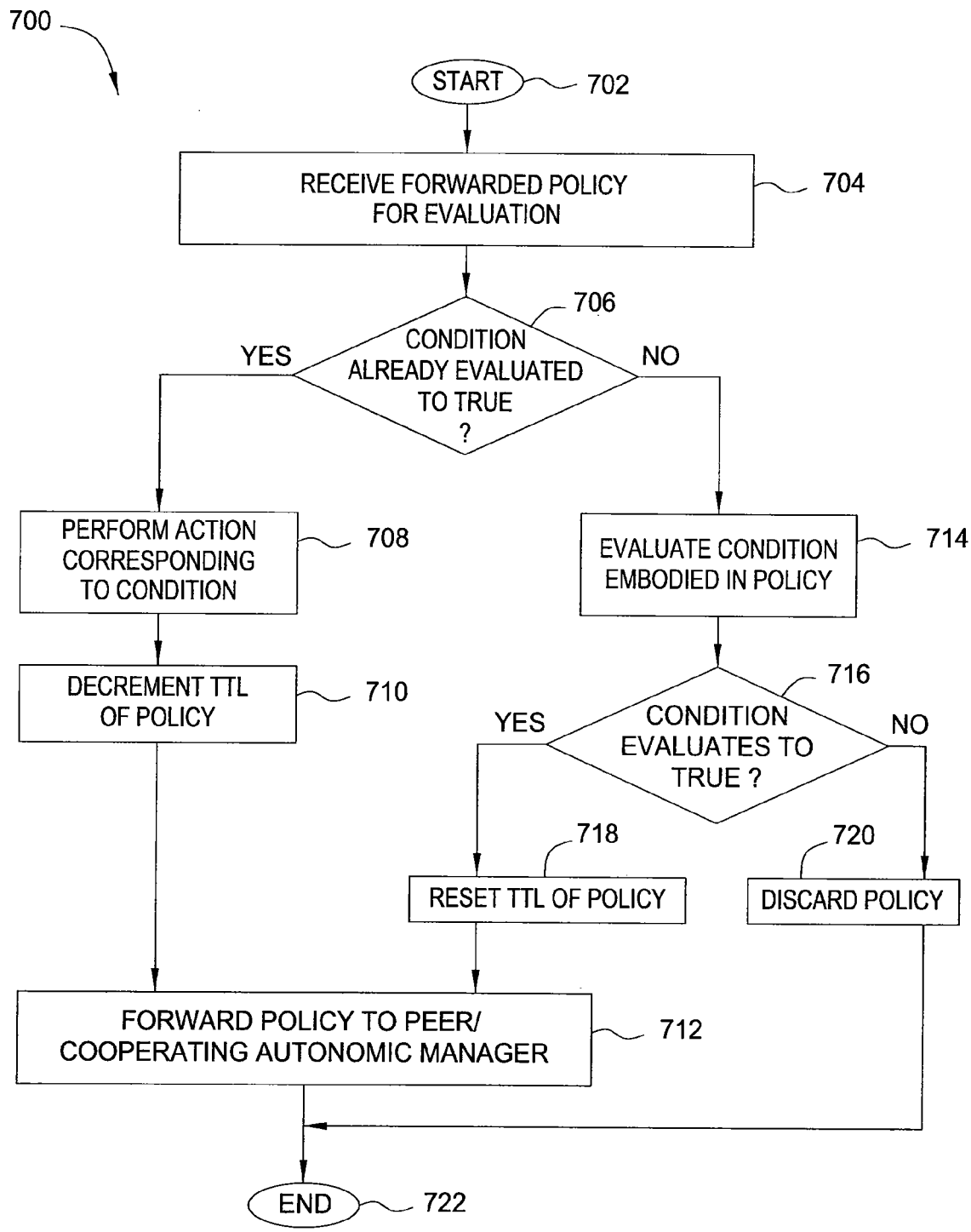
FIG. 7 is a flow diagram illustrating another embodiment of a method for evaluating policies in a policy-based management system.

FIG. 7 is a flow diagram illustrating another embodiment of a method 700 for evaluating policies in a policy-based management system. The method 700 may be implemented, for example, by a cooperating autonomic manager 504 of the system 500 illustrated in FIG. 2. Additionally, the method 700 may be implemented by the designated autonomic manager 502 of the system 500.

The method 700 is initialized at step 702 and proceeds to step 704, where the method 400 receives a policy (forwarded, for example, by a peer/cooperating autonomic manager). In step 706, the method 700 determines whether the condition embodied in the forwarded policy has already evaluated to TRUE.

If the method 700 determines in step 710 that the condition embodied in the forwarded policy has already evaluated to TRUE, the method 700 performs the action(s) corresponding to the condition in step 708.

In step 710, the method 700 decrements a TTL of the forwarded policy (e.g., by one). The method 700 then proceeds to step 712 and forwards the forwarded policy to a next peer/cooperating autonomic manager before terminating in step 722.

Referring back to step 706, if the method 700 concludes that the condition embodied in the forwarded policy has not already evaluated to TRUE, the method 700 proceeds to step 714 and at least partially evaluates the condition embodied in the policy (e.g., using sensor data and/or any other relevant data available to the method 700). The method 700 then determines in step 716 whether the condition embodied in the forwarded policy evaluates to TRUE based on the evaluation of step 714.

If the method 700 concludes in step 716 that the condition embodied in the forwarded policy does evaluate to TRUE, the method 700 proceeds to step 718 and resets the TTL of the forwarded policy to its original value (e.g., N). The method 700 then proceeds to step 712 and proceeds as described above to forward the forwarded policy to a next peer/cooperating autonomic manager. Alternatively, if the method 700 concludes in step 716 that the condition embodied in the forwarded policy evaluates to FALSE, the method 700 discards the policy in step 720 before terminating in step 722.

Figure 8:
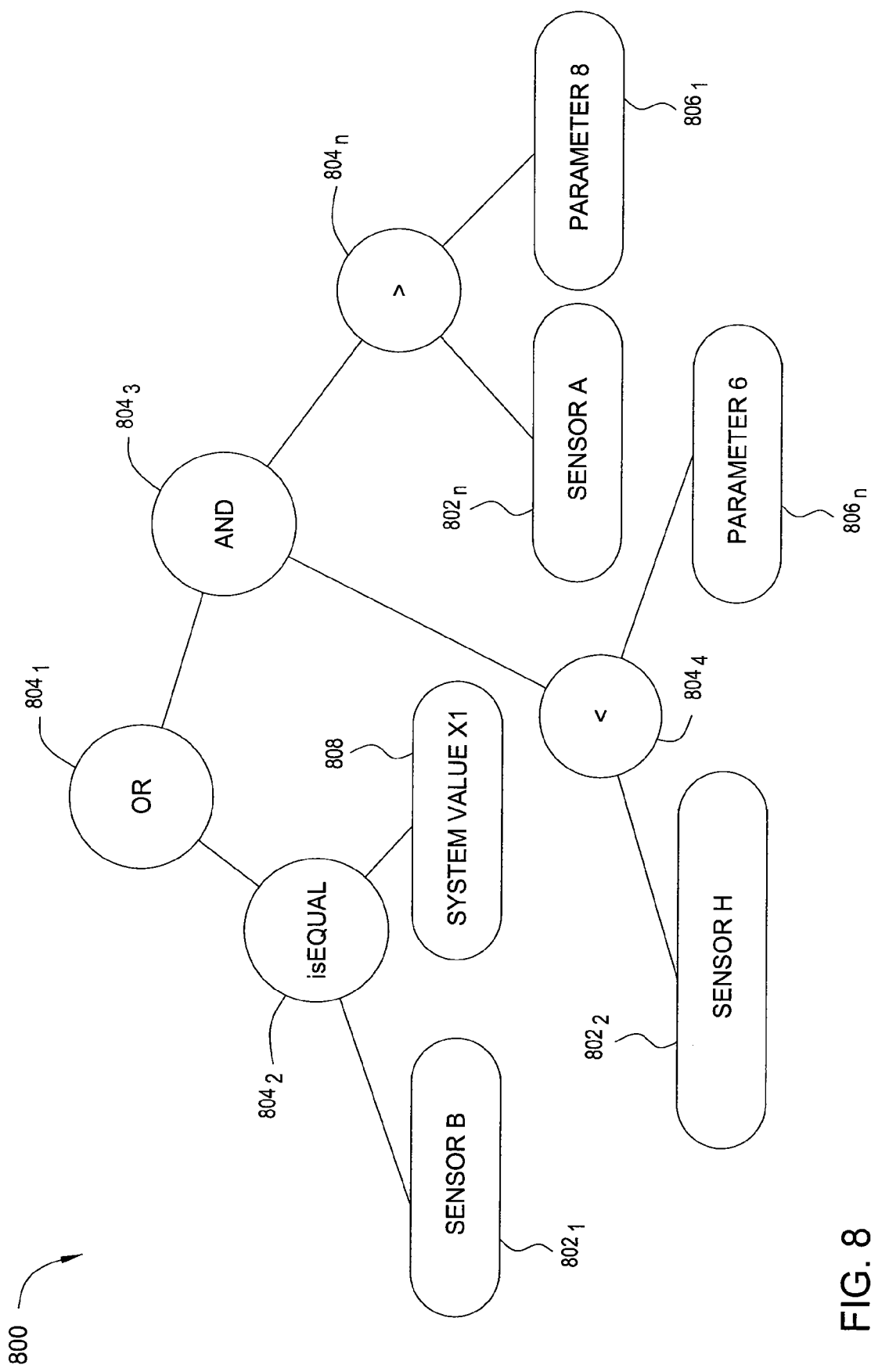
FIG. 8 is a schematic diagram illustrating an exemplary condition expression of a policy that may be evaluated in accordance with the present invention.

FIG. 8 is a schematic diagram illustrating an exemplary condition expression 800 of a policy that may be evaluated in accordance with the present invention. As illustrated, the condition expression 800 comprises a plurality of sensor values $802_1$-$802_n$ (hereinafter collectively referred to as "sensor values 802"), a plurality of logical operators $804_1$-$804_n$ (hereinafter collectively referred to as "operators 804"), a plurality of system parameters $806_1$-$806_n$ (hereinafter collectively referred to as parameters 806) and one or more system values 808.

The operators 804 relate the sensor values 802 to the system value(s) 808 and parameters 806. Specifically, the condition expression 800 evaluates to TRUE when the sensor values 802 satisfy the criteria defined by the operators 804 in conjunction with the system value(s) 808 and parameters 806. In plain English, the condition expression 800 states: "IF ((B==X1) OR ((H<6) AND (A>8)))". The sensor values 802 may each belong to a different domain, in which case the condition embodied in the condition expression 800 will need to be at least partially evaluated by three different autonomic managers.

Figure 9:
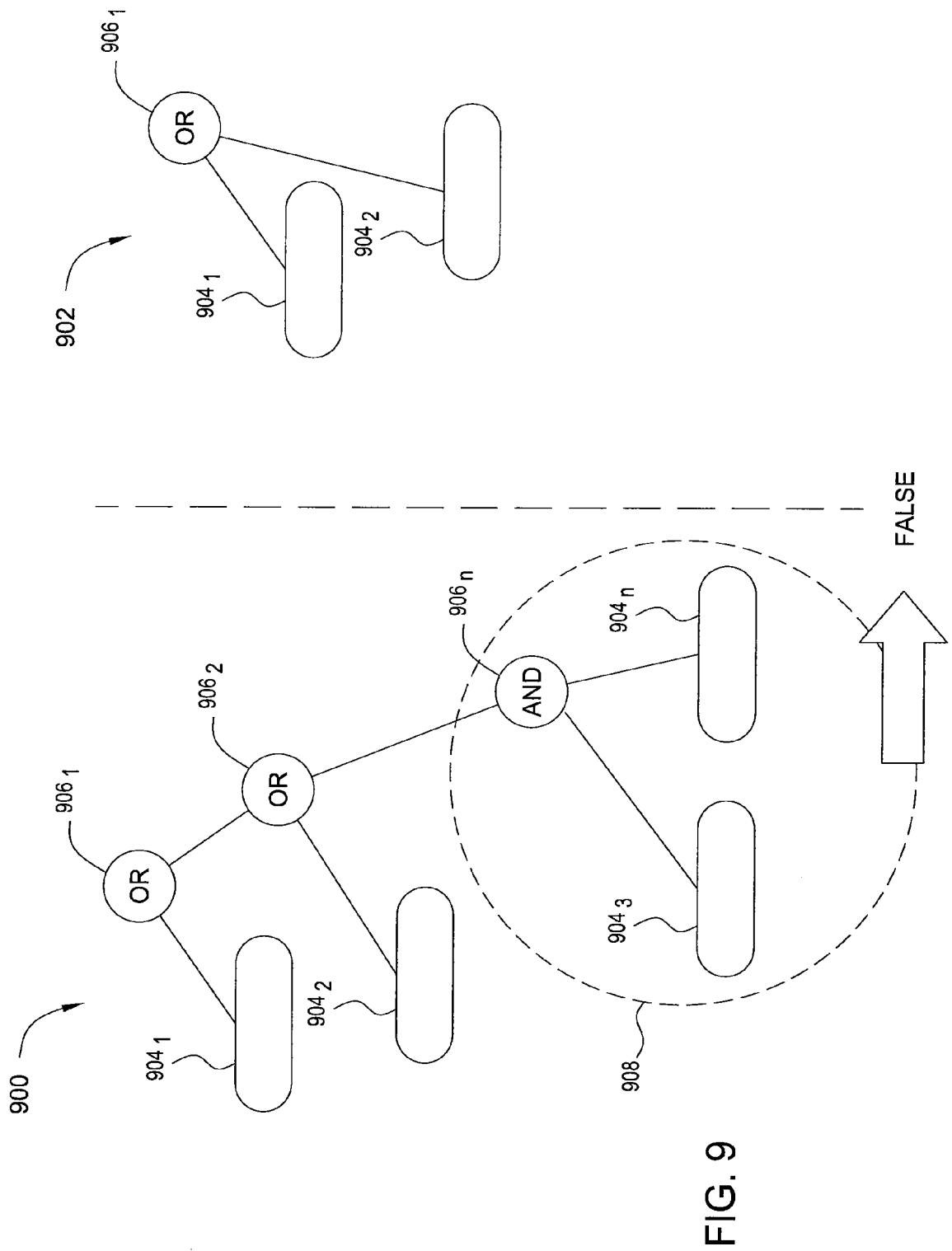
FIG. 9 is a schematic diagram illustrating an exemplary condition expression and its partial evaluation results.

FIG. 9 is a schematic diagram illustrating an exemplary condition expression 900 and its partial evaluation results 902 (e.g., as evaluated by a first autonomic manager). Like the condition expression 800 illustrated in FIG. 8, the condition expression 900 comprises a plurality of sensor values/system parameters/system values $904_1$-$904_n$ and a plurality of logical operators $906_1$-$906_n$.

FIG. 9 further illustrates one embodiment of a method for simplifying a condition expression, according to the present invention. For instance, as illustrated, the sub-tree 908 that is rooted by the AND operator $906_n$ evaluates to FALSE. Thus, the sub-tree 908 is removed from the condition expression 900, along with the OR operator $906_2$, as a result of this simplification. The remainder of the condition expression 900 is rooted by the OR operator $906_1$. The simplified, partial evaluation results 902 are what are forwarded (e.g., to a coordinating autonomic manager or to a peer cooperating autonomic manager, depending upon the configuration of the management system).

Figure 10:
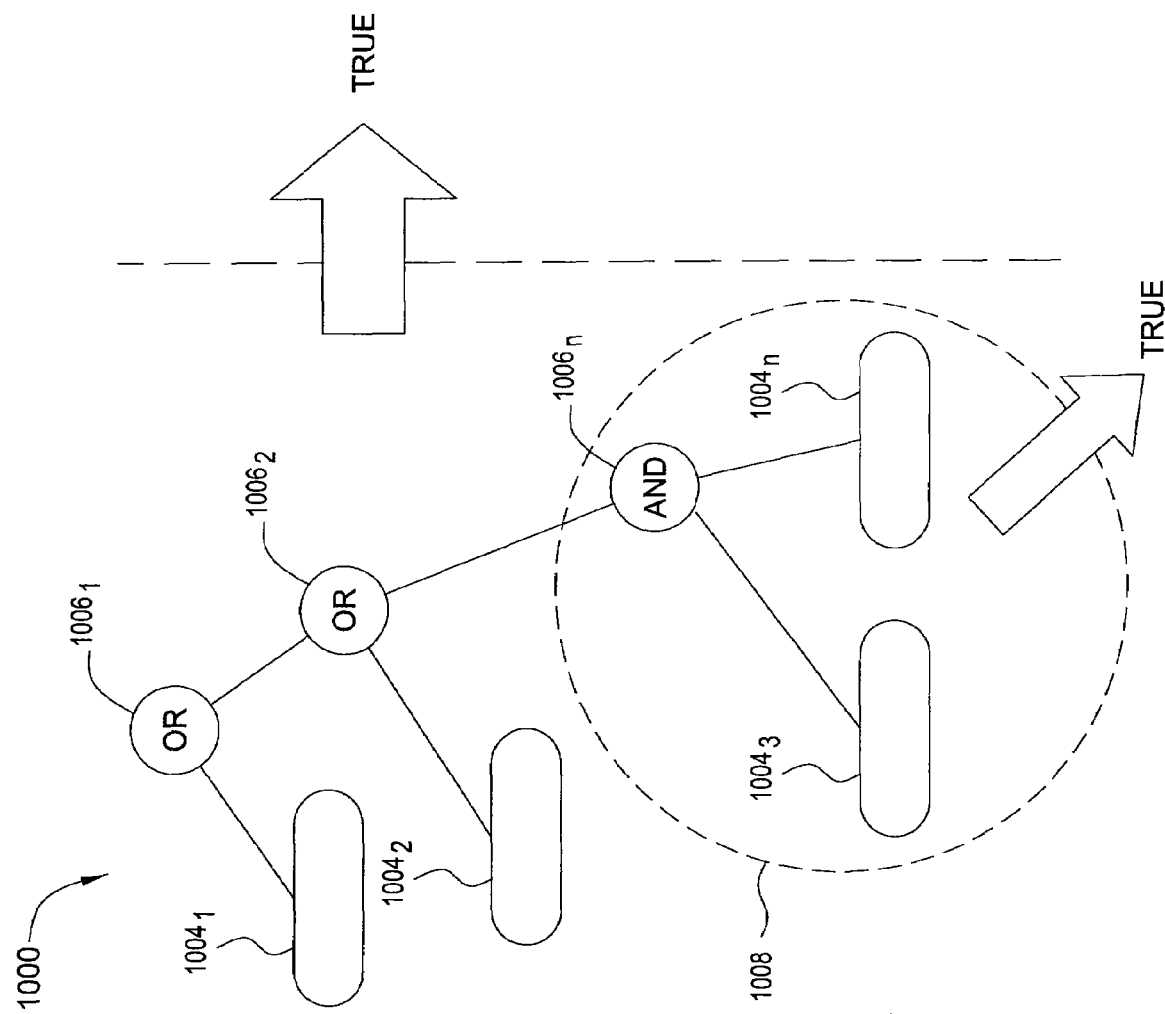
FIG. 10 is a schematic diagram illustrating another exemplary condition expression and its partial evaluation results.

FIG. 10 is a schematic diagram illustrating another exemplary condition expression 1000 and its partial evaluation results 1002 (e.g., as evaluated by a first autonomic manager). Like the condition expressions 800 and 900 illustrated in FIGS. 8 and 9, the condition expression 1000 comprises a plurality of sensor values/system parameters/system values $1004_1$-$1004_n$ and a plurality of logical operators $1006_1$-$1006_n$. As illustrated, the sub-tree 1008 that is rooted by the AND operator $1006_n$ evaluates to TRUE. Thus, the entire condition expression 1000 simplifies to TRUE.

Figure 11:
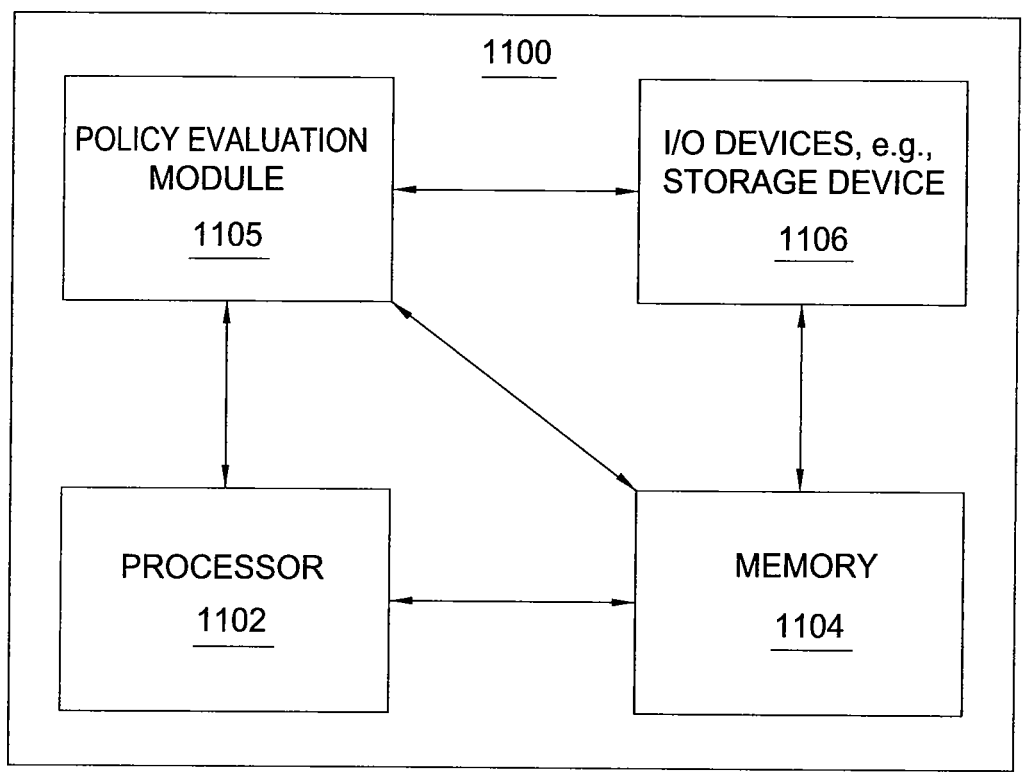
FIG. 11 is a high level block diagram of the present policy evaluation method that is implemented using a general purpose computing device.

FIG. 11 is a high level block diagram of the present policy evaluation method that is implemented using a general purpose computing device 1100. In one embodiment, a general purpose computing device 1100 comprises a processor 1102, a memory 1104, a policy evaluation module 1105 and various input/output (I/O) devices 1106 such as a display, a keyboard, a mouse, a modem, a network connection and the like. In one embodiment, at least one I/O device is a storage device (e.g., a disk drive, an optical disk drive, a floppy disk drive). It should be understood that the policy evaluation module 1105 can be implemented as a physical device or subsystem that is coupled to a processor through a communication channel.

Alternatively, the policy evaluation module 1105 can be represented by one or more software applications (or even a combination of software and hardware, e.g., using Application Specific Integrated Circuits (ASIC)), where the software is loaded from a storage medium (e.g., I/O devices 1106) and operated by the processor 1102 in the memory 1104 of the general purpose computing device 1100. Additionally, the software may run in a distributed or partitioned fashion on two or more computing devices similar to the general purpose computing device 1100. Thus, in one embodiment, the policy evaluation module 1105 for evaluation of systems management policies described herein with reference to the preceding figures can be stored on a computer readable medium or carrier (e.g., RAM, magnetic or optical drive or diskette, and the like).

Thus, the present invention represents a significant advancement in the field of systems management. Embodiments of the present invention provide for the partial evaluation of unified policies in a cooperative, distributed systems environment. This allows a system administrator to specify unified policies targeting all of the different domains (e.g., Quality of Service (QoS), Security, Database, etc.) of an information technology (IT) environment, instead of specifying separate policies for each domain. The administration of the IT environment is thus automated and greatly simplified.

While the foregoing is directed to the illustrative embodiment of the present invention, other and further embodiments of the invention may be devised without departing from the basic scope thereof, and the scope thereof is determined by the claims that follow.

The invention claimed is:

1. A method for evaluating a systems management policy in an environment comprising a plurality of domains, the method comprising:
retrieving the policy, by a first autonomic manager in a first domain of the plurality of domains, from a policy storage, wherein the policy comprises a condition and an action to be taken when the condition evaluates to TRUE, and wherein the policy expresses the condition as a plurality of sensor values related to a plurality of system values by a plurality of logical operators, and at least two of the plurality of sensor values belong to different ones of the plurality of domains;
forwarding the policy, by the first autonomic manager, to a second autonomic manager in a second domain of the plurality of domains;
evaluating at least a portion of the condition by the first autonomic manager, in accordance with sensor data relating to a resource managed by the first autonomic manager, before forwarding the policy;
wherein the evaluating at least a portion of the condition comprises simplifying the condition by removing a portion of the plurality of sensor values relating to a portion of the condition that has already been evaluated; and
receiving, at the first autonomic manager, at least partial evaluation results for the condition from a third autonomic manager in a third domain of the plurality of domains,
wherein the first autonomic manager, the second autonomic manager, and the third autonomic manager are arranged in a ring configuration such that the evaluating occurs in a cascading manner.

2. The method of claim 1, further comprising:
determining, at the first autonomic manager, whether the condition evaluates to TRUE, in accordance with the at least partial evaluation results.

3. The method of claim 2, further comprising:
broadcasting, by the first autonomic manager, the action to the second autonomic manager, when the condition evaluates to TRUE in accordance with the at least partial evaluation results.

4. The method of claim 1,
wherein the first autonomic manager is a peer of the second autonomic manager.

5. A non-transitory computer readable medium containing an executable program for evaluating a systems management policy, in an environment comprising a plurality of domains, where the program performs steps of:
retrieving the policy, by a first autonomic manager in a first domain of the plurality of domains, from a policy storage, wherein the policy comprises a condition and an action to be taken when the condition evaluates to TRUE, and wherein the policy expresses the condition as a plurality of sensor values related to a plurality of system values by a plurality of logical operators, and at least two of the plurality of sensor values belong to different ones of the plurality of domains;
forwarding the policy, by the first autonomic manager, to a second autonomic manager in a second domain of the plurality of domains;
evaluating at least a portion of the condition by the first autonomic manager, in accordance with sensor data relating to a resource managed by the first autonomic manager, before forwarding the policy;
wherein the evaluating at least a portion of the condition comprises simplifying the condition by removing a portion of the plurality of sensor values relating to a portion of the condition that has already been evaluated; and
receiving, at the first autonomic manager, at least partial evaluation results for the condition from a third autonomic manager in a third domain of the plurality of domains,
wherein the first autonomic manager, the second autonomic manager, and the third autonomic manager are arranged in a ring configuration such that the evaluating occurs in a cascading manner.

6. System for evaluating a systems management policy, in an environment comprising a plurality of domains, the system comprising:
means for retrieving the policy, by a first autonomic manager in a first domain of the plurality of domains, from a policy storage, wherein the policy comprises a condition and an action to be taken when the condition evaluates to TRUE, and wherein the policy expresses the condition as a plurality of sensor values related to a plurality of system values by a plurality of logical operators, and at least two of the plurality of sensor values belong to different ones of the plurality of domains;
means for forwarding the policy, by the first autonomic manager, to a second autonomic manager in a second domain of the plurality of domains;

wherein at least a portion of the condition is evaluated by the first autonomic manager, in accordance with sensor data relating to a resource managed by the first autonomic manager, before forwarding the policy;

wherein the evaluating at least a portion of the condition comprises simplifying the condition by removing a portion of the plurality of sensor values relating to a portion of the condition that has already been evaluated; and means for receiving, at the first autonomic manager, at least partial evaluation results for the condition from a third autonomic manager in a third domain of the plurality of domains, wherein the first autonomic manager, the second autonomic manager, and the third autonomic manager are arranged in a ring configuration such that the evaluating occurs in a cascading manner.

7. System for evaluating systems management policies in an environment comprising a plurality of domains, the system comprising:

a primary autonomic manager in a first domain of the plurality of domains, for coordinating evaluation of the policies, wherein the policies each comprise a condition and an action to be taken when the condition evaluates to TRUE, and wherein the policies each express the condition as a plurality of sensor values related to a plurality of system values by a plurality of logical operators, and at least two of the plurality of sensor values belong to different ones of the plurality of domains, and wherein at least a portion of the condition is evaluated by the first autonomic manager, in accordance with sensor data relating to a resource managed by the first autonomic manager, wherein the evaluating at least a portion of the condition comprises simplifying the condition by removing a portion of the plurality of sensor values relating to a portion of the condition that has already been evaluated, before determining the action to be taken when the condition evaluates to TRUE;

a plurality of secondary autonomic managers, each of the plurality of secondary autonomic managers being in different ones of the plurality of domains and configured to evaluate a different portion of the condition and to report an evaluation result to the primary autonomic manager; and a policy editor storage in which the policies are stored, wherein the primary autonomic manager and the plurality of secondary autonomic managers are arranged in a ring configuration such that the evaluating occurs in a cascading manner, and wherein at least one of: the primary autonomic manager or the plurality of secondary autonomic managers comprises a hardware processor.

8. The system of claim 7, wherein the primary autonomic manager is further configured to broadcast the action to the plurality of secondary autonomic managers when the condition evaluates to TRUE.

9. The system of claim 7, wherein each of the primary autonomic manager and the plurality of secondary autonomic managers comprises:

at least one sensor for obtaining data from a managed resource, the data being used to evaluate the policies; and at least one effector for effecting actions in the managed resource, in accordance with the policies.

10. The system of claim 7, wherein each of the primary autonomic manager and the plurality of secondary autonomic managers is configured to forward the policies to a peer after at least partially evaluating the policies.

11. The system of claim 10, wherein each of the primary autonomic manager and the plurality of secondary autonomic managers is configured to reset a time to live of a received policy before forwarding the policy, if a condition of the policy evaluates to TRUE.

12. The system of claim 10, wherein each of the primary autonomic manager and the plurality of secondary autonomic managers is configured to discard a received policy, if a condition of the policy does not evaluate to TRUE.

13. The system of claim 10, wherein each of the primary autonomic manager and the plurality of secondary autonomic managers is further configured to perform an action corresponding to a condition of a received policy when the condition has evaluated to TRUE by a peer from which the policy was received.

14. The system of claim 13, wherein each of the primary autonomic manager and the plurality of secondary autonomic managers is further configured to decrement a time to live of the policy before forwarding.

* * * * *